United States Patent [19]

Kestermeier et al.

[11] 3,958,668
[45] May 25, 1976

[54] CLOSED LOOP TYPE DISC BRAKE

[75] Inventors: William J. Kestermeier; James J. Colpaert, both of South Bend, Ind.

[73] Assignee: The Bendix Corporation, South Bend, Ind.

[22] Filed: Dec. 23, 1974

[21] Appl. No.: 535,938

[52] U.S. Cl. .............................................. 188/73.4
[51] Int. Cl.² ...................................... F16D 55/228
[58] Field of Search ................ 188/72.4, 72.5, 73.3, 188/73.4, 73.6

[56] References Cited
UNITED STATES PATENTS

| | | | |
|---|---|---|---|
| 3,363,727 | 1/1968 | Thrion .............................. | 188/73.4 |
| 3,442,353 | 5/1969 | Harrison ........................... | 188/73.4 |
| 3,470,985 | 10/1969 | Redmayne et al. ................ | 188/73.4 |
| 3,580,362 | 5/1971 | Falk .................................. | 188/72.4 |
| 3,688,876 | 9/1972 | Harai et al. ....................... | 188/73.3 |
| 3,800,923 | 4/1974 | Rike .................................. | 188/73.6 |
| 3,844,384 | 10/1974 | Toshida et al. ................... | 188/73.4 |

FOREIGN PATENTS OR APPLICATIONS

| | | | |
|---|---|---|---|
| 2,014,468 | 10/1970 | Germany .......................... | 188/73.3 |

*Primary Examiner*—Trygve M. BLix
*Assistant Examiner*—Edward R. Kazenske
*Attorney, Agent, or Firm*—Ken C. Decker; William N. Antonis

[57] ABSTRACT

A disc brake is disclosed which includes a rotatable disc, a pair of friction elements disposed opposite friction faces of the disc, and a caliper movable axially with respect to the disc to urge the friction element into braking engagement with the friction faces of the disc when a brake application is effected. The caliper includes a fluid motor portion which includes a pair of circumferentially spaced arms which traverse the periphery of the rotor. The caliper further includes a stamped collar member which encircles the friction elements and the fluid motor portion and includes a circumferentially spaced section which traverse the periphery of the discs. Fastening means secure each of the arms to the portion of the collar disposed adjacent the friction element engaging the side of the disc opposite to the side of the disc on which the fluid motor portion is mounted. One of the friction elements anchors against the circumferentially spaced arms during a brake application, and the other friction element anchors through the collar.

4 Claims, 3 Drawing Figures

CLOSED LOOP TYPE DISC BRAKE

BACKGROUND OF THE INVENTION

This invention relates to a disc brake for an automotive vehicle.

Disc brakes have been used on automotive vehicles for many years. Of course, it is desirable to simplify the construction of the disc brake as much as possible while maximizing its performance. In this regard, smaller vehicles may be provided with brakes substantially different from those required on larger vehicles, to minimize cost. The present invention is similar to the brake disclosed in copending U.S. Pat. Application Ser. No. 471,265 and No. 471,266, both of which were filed on May 20, 1974, and each of which is owned by the assignee of the present invention. However, the brake disclosed in these applications required that the spindle or fixed support on which the brake is mounted be modified to accommodate the inner shoe, which anchored directly upon the spindle. In the brake disclosed in the present application, the spindle need not be modified, as both friction elements anchor directly upon the caliper.

SUMMARY OF THE INVENTION

Therefore, an important object of our invention is to provide a disc brake for an automotive vehicle in which both friction pads anchor directly upon the caliper when a brake application is effected.

Another important object of our inveniton is to provide a disc brake for an automotive vehicle which does not require any modification in the spindle or other fixed support upon which the brake is mounted.

Another important object of our invention is to design a disc brake which may be shipped to the vehicle assembly plant as an integral unit, with all component parts already assembled.

Another important object of our invention is to provide a disc brake of the so-called "chordal" type in which a stamped steel collar encircles the friction element, but which may be used on slightly larger vehicles than chordal type brakes known in the prior art.

DESCRIPTION OF THE PREFERRED EMBODIMENT

Figure 1:
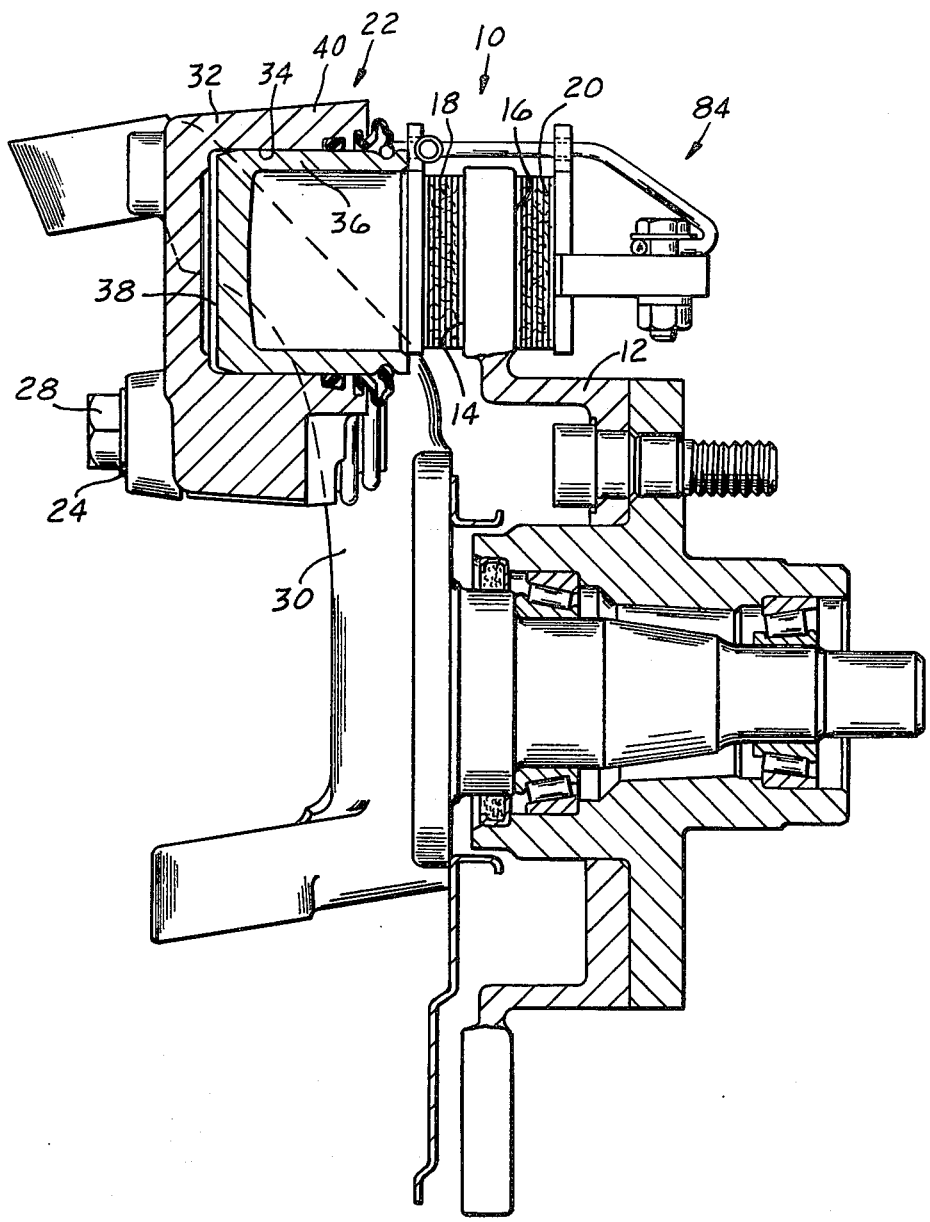
FIG. 1 is a cross-sectional view of a disc brake made pursuant to the teachings of our present invention and which is illustrated in its installed position on the vehicle.
Figure 2:
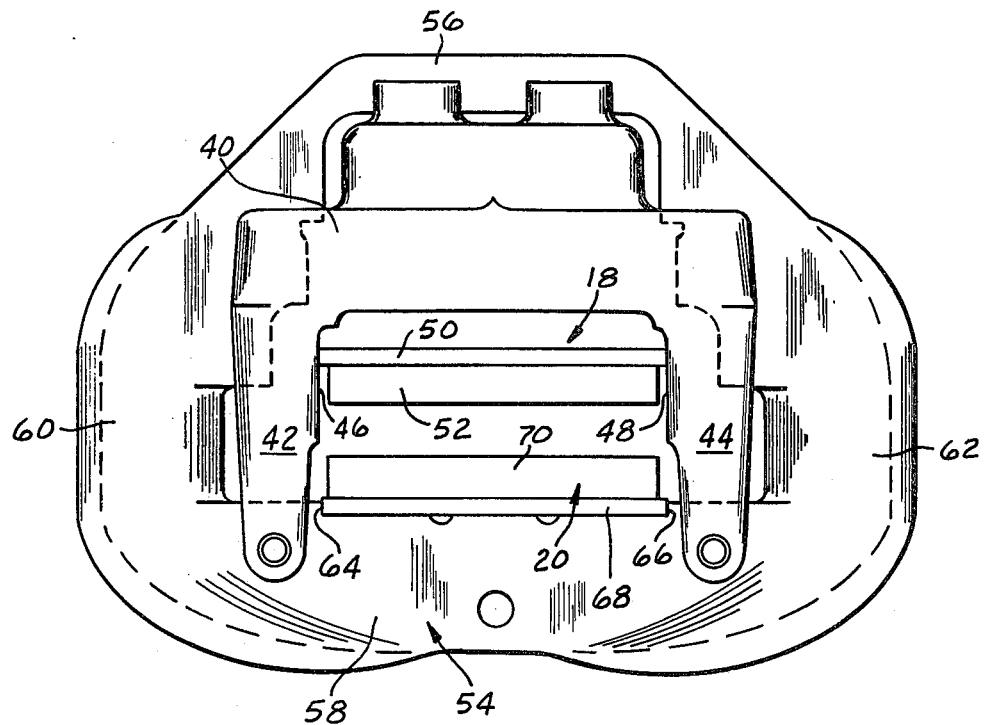
FIG. 2 is a top plan view of the disc brake illustrated in FIG. 1.
Figure 3:
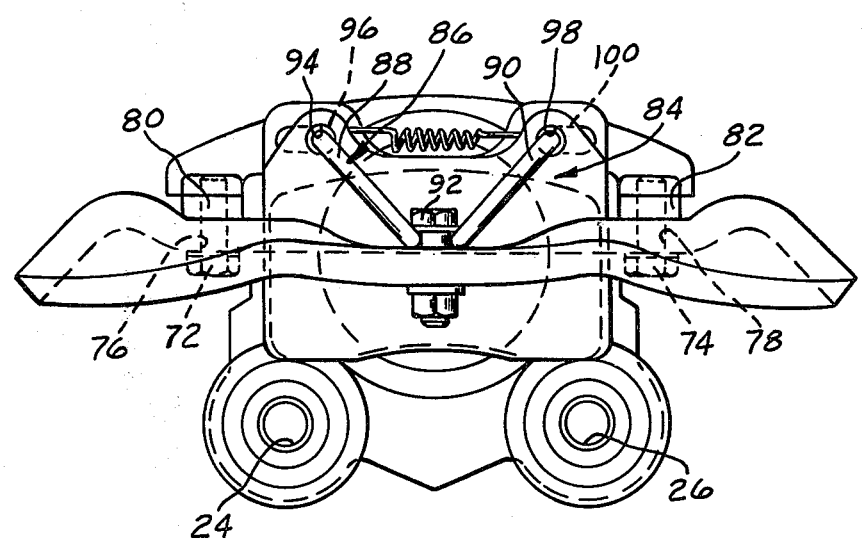
FIG. 3 is a side elevational view of the right-hand side of the brake illustrated in FIGS. 1 and 2.

Referring now to the drawings, a disc brake generally indicated by the numeral 10 includes a rotor 12 having a pair of friction faces 14 and 16. A pair of friction elements 18, 20 are disposed adjacent the friction faces 14 and 16, respectively, and are urged against the latter when a brake application is effected. The brake 10 further includes a caliper generally indicated by the numeral 22 which is slidably mounted to a fixed support or other non-rotating element of the vehicle for movement generally parallel to the axis of rotation of the rotor 12. Consequently, the caliper 22 is provided with a pair of apertures 24, 26 which receive pins 28 which are fastened to a fixed support, such as the spindle housing 30. The pins 28 extend through the apertures 24, 26 so that the caliper 22 is able to slide along the axis of the pins. The pins 28 are identical to the pin described in the aforementioned patent application No. 471,266, filed May 20, 1974, and will not be further described herein as they form no part of the present invention.

The caliper 22 includes a fluid motor portion 32 which defines a bore 34 therewithin. A fluid pressure responsive piston 36 is slidably mounted in bore 34 and cooperates with the end of the latter to define chamber 38 therebetween. The fluid motor portion 32 includes the fluid housing 40 which defines the bore 34 therewithin, and a pair of circumferentially spaced arms 42, 44 which project from the housing 40 across the periphery of the rotor or disc 12. Each of the arms 42, 44 are provided with generally parallel facing edges 46, 48 which define a compartment therebetween receiving the friction element 18. Friction element 18 includes a backing plate 50 upon which the friction material 52 is secured, and the edges of the backing plate 50 slidably engage the edges 46 and 48 of the arms 42 and 44 so that, when a brake application is effected, the friction element 18 will anchor upon one of the edges 46 or 48 depending upon the direction of rotation of the rotor 12.

The caliper 22 further includes a stamped collar member 54 which encircles the fluid motor portion 32 and both of the friction elements 18 and 20. The collar member 54 includes a portion 56 adjacent the cylinder housing 40 and another portion 58 on the side of the disc opposite the side upon which the cylinder housing 40 is mounted and which embraces the friction element 20. Collar member 54 further includes a pair of circumferentially spaced portions 60, 62, which traverse the periphery of the rotor 12 and which interconnect the portions 56 and 58. The portion 58 is provided with edges 64, 66 thereon which define a recess receiving the backing plate 68 of the friction element 20. Friction element 20 further includes the friction material 70, which is mounted on the backing plate 68 by any suitable manner well known to those skilled in the art. Bolts 72, 74 extend through apertures 76, 78 and the portion 58 of the collar 54 and engage threaded apertures 80, 82 in the arms 42, 44 to thereby secure the collar 54 to the fluid motor portion 32.

The friction elements 18, 20 are retained on the caliper 22 by retention apparatus generally indicated by the numeral 84. Retention apparatus 84 includes a bent wire member 86 which includes a pair of arms 88, 90 and which is fastened to the collar 54 by bolt 92. The arm 88 extends through apertures 94, 96 and the friction elements 20 and 18 respectively, and the arm 90 extends through apertures 98, 100 and the friction elements 20 and 18, respectively. Diameter of the apertures 94, 96, 98 and 100 are substantially larger than the diameter of the legs 88 and 90, so that the bent wire clip 86 does not take any torque, all of the torque being taken by the edges 46, 48 of the arms 42, 44 and by the edges 64, 66 of the portion 58 of the collar 54.

MODE OF OPERATION

When a brake application is effected, high pressure fluid is communicated into the variable volume chamber 38 from the vehicle master cylinder and reacts upon the end of the piston 36 to urge the latter to the right viewing FIG. 1. Moving the piston 36 to the right urges friction element 18 into braking engagement with friction face 14 of the rotor 12. Because of the sliding connections between the ends 28 and the apertures 24, 26, reaction forces due to the fluid pressure in variable volume chamber 38 will react upon the end of the fluid motor housing 40, thereby urging the latter, and consequently the collar 54, to the left viewing FIG. 1. As the collar 54 moves to the left, the friction element 20 will be urged into braking engagement with the friction face 16 of the rotor 12, thereby effecting the brake engagement. Assuming rotation of the rotor 12 in the direction of the arrow A, engagement of the friction elements 18 and 20 with the rotor will cause the backing plate 50 of the friction element 18 to engage the edge 46 of the arm 42, thereby transferring braking torque to the arm 42. At the same time, engagement of the friction element 20 with the rotor 12 will cause the backing plate 68 of the friction element 20 to engage the edge 64, thereby transferring the torque generated by engagement of the friction element 20 with the rotor 12 to the collar 54. The torque transmitted through the collar 54 and through the arms 42, 44 are eventually transferred to the fixed support 30 through the pins 26, 28.

We claim:
1. In a disc brake:
a rotor having a pair of friction faces;
a pair of friction elements, one of said friction elements being disposed adjacent each of said friction faces and adapted to engage the latter when a brake application is effected;
a fixed support mounted adjacent said rotor;
a caliper slidably mounted on said fixed support for urging said friction elements into braking engagement with said friction faces when a brake application is effected;
said caliper including a fluid motor portion disposed adjacent one of said friction elements, said fluid motor portion including a pair of circumferentially spaced arms projecting across the periphery of said rotor, said arms being integral with said fluid motor portion, said caliper further including a collar having a section embracing the other friction element and traversing sections extending from opposite ends of said embracing section, said traversing sections extending across the periphery of said rotor generally parallel to corresponding arms, and means rigidly fastening each of said arms to said embracing section of the collar so that said fluid motor portion and said collar move as a unit;
each of said arms having an edge facing the corresponding edge of the other arm, the facing edges of said arms defining a recess therebetween, said one friction element being located in said recess, said facing edges defining torque-receiving abutment surfaces, said one friction element transmitting braking torque to a corresponding one of said torque-receiving abutment surfaces when a brake application is effected.

2. The invention of claim 1:
said collar encircling said friction elements and said fluid motor portion.

3. The invention of claim 2:
said embracing section including means defining abutment surfaces, said other friction element anchoring against the abutment surfaces on the collar when a brake application is effected.

4. The invention of claim 3:
said fastening means including a pair of bolts, each of said bolts securing one of said arms to said collar.

* * * * *